United States Patent
Callendrier

[19]

[11] Patent Number: 6,122,978
[45] Date of Patent: Sep. 26, 2000

[54] WEB TENSION CANTILEVER TRANSDUCER APPARATUS

[75] Inventor: Thierry Callendrier, Middleburg Hts., Ohio

[73] Assignee: Cleveland Motion Controls, Cleveland, Ohio

[21] Appl. No.: 09/053,800

[22] Filed: Apr. 2, 1998

[51] Int. Cl.[7] ............................... G01L 1/22; G01L 1/04
[52] U.S. Cl. ................... 73/862.474; 73/862.451
[58] Field of Search ............... 73/862.474, 862.473, 73/862.391, 862.42, 862.451

[56] References Cited

U.S. PATENT DOCUMENTS

| Re. 31,312 | 7/1983 | Eddens . | |
|---|---|---|---|
| 3,260,106 | 7/1966 | Hull et al. . | |
| 3,439,761 | 4/1969 | Laimins . | |
| 3,589,181 | 6/1971 | Palmatier et al. | 73/862.474 |
| 3,763,701 | 10/1973 | Wright et al. . | |
| 3,927,560 | 12/1975 | Farr . | |
| 4,015,468 | 4/1977 | Simon . | |
| 4,052,891 | 10/1977 | Bartlett . | |
| 4,130,014 | 12/1978 | Eddens . | |
| 4,281,539 | 8/1981 | Keller . | |
| 4,326,424 | 4/1982 | Koenig . | |
| 4,674,341 | 6/1987 | Koenig . | |
| 4,735,102 | 4/1988 | Koenig . | |
| 4,784,004 | 11/1988 | Ekola . | |
| 4,796,474 | 1/1989 | Koenig . | |
| 4,958,525 | 9/1990 | Hauer et al. | 73/862.474 |
| 5,020,381 | 6/1991 | Bartlett | 73/862.471 |

FOREIGN PATENT DOCUMENTS

| 25 20 672 | 5/1975 | Germany . |
|---|---|---|
| 24 52 925 | 5/1976 | Germany . |
| 1263182 | 2/1972 | United Kingdom . |

*Primary Examiner*—Max Noori
*Attorney, Agent, or Firm*—Vickers, Daniels & Young

[57] ABSTRACT

A moving web tension monitoring apparatus of easily fabricated, relatively inexpensive and easily assembled construction comprises a cantilever mounted strain beam element coupled at the flexurable end thereof through a rigid coupling to one end of the support shaft for the web supporting guide roll. A twin beam type transducer having strain gauges at the flex points of the beams is coupled to the shaft supporting the moving web. The strain gauges are located and electrically connected to measure the radial forces applied to the shaft by the web independently of the length of the shaft.

58 Claims, 4 Drawing Sheets

WEB TENSION CANTILEVER TRANSDUCER APPARATUS

This invention relates in general to a monitoring apparatus for measuring and indicating the tension in a continuously moving web, and, more particularly, to an apparatus for sensing the tension in rapidly moving webs and producing a signal with respect to such tension.

INCORPORATION BY REFERENCE

This invention relates to improvements in the transducer devices described in U.S. Pat. No. 3,260,106 Hull, et al, issued Jul. 12, 1966; U.S. Pat. No. 3,763,701 Wright, et al, issued Oct. 9, 1973; U.S. Pat. No. 4,052,891 Bartlett, issued Oct. 11, 1977; U.S. Pat. No. 4,281,539 Keller, issued Aug. 4, 1981; U.S. Pat. No. 4,326,424 Koenig, issued Apr. 27, 1982; Re. 31,312 Eddens, reissued Jul. 19, 1983; U.S. Pat. No. 4,674,341 Koenig, issued Jun. 23, 1987; U.S. Pat. No. 4,735,102 Koenig, issued Apr. 5, 1988; U.S. Pat. No. 4,784,004 Ekola, issued Nov. 15, 1988; and U.S. Pat. No. 4,796,474 Koenig, issued Jan. 10, 1989. The disclosures of such patents are incorporated herein by reference.

BACKGROUND OF THE INVENTION

In web handling processes, wherein a web of flexible material such as a fabric, paper, or metal is continuously passed at high speeds partly around a guide roll either fixed or rotatably supported on a shaft, it is known to support one or both ends of the shaft by a transducer device capable of measuring the transverse or radial forces exerted on the roll by the tensions in the moving web and then making continuing adjustments to the web tension, responsive to the ongoing web tension measurements, either by manual or automatic control equipment. These known web tension measuring devices are customarily comprised of a sensor in the form of a strain beam cantilever mounted on a fixed frame and the flexurable free end of which is coupled to and supports an end of the guide roll shaft through either a thin flexurable steel diaphragm or a pivotal connection such as a self-aligning bearing. Strain gauges attached to the strain beam and connected in an electrical circuit then generate a continuing electrical signal representative of the beam deflection by the web tension forces that are representative of the instantaneous tension in the moving web. Many of these measurement devices are quite sensitive to small force variations, so much so, in fact, that the response curve has an undesirable hysteresis loop therein. This was caused by the friction in the hinged or jointed connection between the axle and the movable face plate. Thus, as tension on the web increased, the beam bends, resulting in its extended axis diverging relative to the roller axis, which divergence is taken up by the hinged connection. Undesirable friction in this connection produced a force couple which, as web tension increases, acted to resist the bending of the beam and therefore caused a reduction in the stress applied to the strain gage and the resultant tension signal. As tension in the web decreased and the beam was unloaded, the friction couple in the hinged connection produced a force couple which acted in the opposite direction and caused an increase in the resultant tension signal. The difference in these signals resulted in a hysteresis loop in the response curve which made the sensor unsatisfactory for extremely critical applications.

To overcome these problems, a sensor was introduced comprised of a pair of parallel spaced arms or beams each integrally connected at one end to the base plate and at the other end to the face plate which face plate then was connected to the axle of the web roller. As this twin beam sensor was loaded, the extended axis from the face plate remained parallel to the unloaded axis and no force couple was introduced due to the bending of the beams. Accordingly, it was found possible to eliminate the expensive bearing connection and a rigid connection between the shaft and the sensor. Such devices were an improvement, even though, in some instances, a hysteresis loop remained. However, it was found that, particularly when the web roller had a substantial length, the axle of the roller was bent or deflected throughout its length by the web tension forces such that its extended axis was no longer parallel to the extended axis of the face plate. This placed one of the beams in longitudinal tension and the other in longitudinal compression which forces affected the strain gages in the same manner as bending forces and gave inaccurate results and hysteresis in the response curve. Further, the arrangement had difficulty accommodating these misalignments of the shaft and/or expansions or contractions thereof. Coupling arrangements for the shaft which are disclosed in U.S. Pat. No. 4,326,424 Koenig, U.S. Pat. No. 4,674,341 Koenig and U.S. Pat. No. 4,796,474 Koenig overcome many of these problems. Although these web tension sensor devices have significantly simplified the fabrication and construction of such devices and have substantially reduced the problems associated with hysteresis, shaft expansion and roller misalignment, these devices all require custom manufacturing for particular applications. This is a result from the devices monitoring the radial forces applied to the shaft are dependent on the length of the shaft. Therefore, each sensor device must be custom manufactured and designed for a particular application.

SUMMARY OF THE INVENTION

The present invention contemplates a new and improved moving web tension sensor and transducer device which overcomes the above referred to problem and others and provides a web tension arrangement for monitoring and measuring the web tension arrangement for monitoring and measuring the web tension independent of the length of the load shaft. The web tension arrangement provides a web tension monitoring and measuring device having a comparatively simple and easily fabricated and assembled construction and having relatively low hysteresis and having the ability to accommodate shaft expansion and a guide roll misalignment without seriously affecting the accuracy of the web tension measurements.

In accordance with the present invention, a strain beam sensor arrangement for the roller in a web tension machine is provided comprised of a twin beam type transducer having a base plate adapted to be mounted on the frame of the web handling apparatus and a movable plate supporting the axle of the web roller. The twin beam transducer includes strain gauges positioned on at least one of the beams. The strain gauges are connected in an electrical circuit to measure the radial forces applied to the axle of the web roller independently of the length of the axle.

In accordance with another aspect of the invention, the twin beam type transducer device includes a pair of extending spaced beam elements. The spaced pair of strain beam elements are preferably symmetrically oriented about the axis of the web roller. Preferably, the strain beam elements are of a mirror reflection, like form. The beam elements are also preferably positioned generally parallel to one another. In one particular preferred embodiment, the beam elements are preferably formed in the sensor beam block member by drilling a cluster array of drill holes therein extending in parallel, overlapping, contiguous relation completely through the block member from one side to the other side thereof and located entirely interiorly of the confines of the block member and of symmetrical form and disposition on opposite sides of the center axis of the block member and together forming a total drilled out interior passage there through laterally extending closely adjacent the top and bottom surfaces of the block member to form thereat the pair of spaced, like form, strain beam elements.

In accordance with still another aspect of the invention, the strain beam of the transducer device includes a pair of essentially parallel extending spaced beam elements where a beam element includes a plurality of sensors for measuring the strain on the beam element. Preferably, the beam element includes two sensors. In accordance with yet another aspect of the invention, both beam elements of the strain beam includes two sensors for measuring the strain on the two beam elements.

In accordance with a further aspect of the invention, a rigid coupling which does not include bearings attaches the guide roll support shaft on the flexurable end of the strain beam means.

The principal object of the invention is to provide a new and improved web tension measuring device which is of a comparatively simple form composed of a minimum number of easily and economically fabricated component parts which are easy to assemble and disassemble, which device can measure radial forces applied to an axle of a variety of web rollers.

Another object of the invention is to provide a web tension measuring device which can measure radial forces applied to an axle of a web roller independently of the length of the roller.

Still another object of the invention is to provide a novel form of strain beam construction of the twin beam type for use in a web tension measuring device, which strain beam is easy and inexpensive to fabricate.

A still further object of the invention is to provide a universal type enclosure housing for the strain beam means of a web tension measuring transducer device which housing is easily adaptable for mounting various forms of such transducer devices on various different types of support frames or mounting members.

Further objects and advantages of the invention will be apparent from the following detailed description of a preferred species thereof and from the accompanying drawings.

BRIEF DESCRIPTION OF THE DRAWINGS

The invention may take the physical form in certain parts and arrangement of parts, a preferred embodiment of which will be described in detail in this specification and illustrated in the accompanied drawing which forms a part hereof and wherein.

DESCRIPTION OF THE PREFERRED EMBODIMENT

Figure 1:
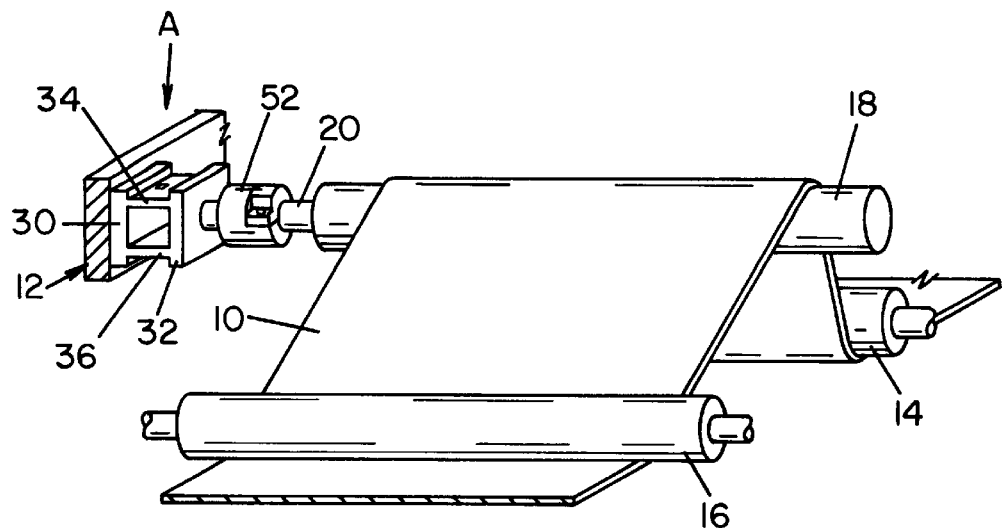
FIG. 1 is a fragmentary perspective view of the general arrangement of a system for monitoring the tension in a moving web.

Referring now to the drawings wherein the showings are for the purposes of illustrating a preferred embodiment of the invention only and not for the purpose of limiting same, FIG. 1 illustrates a web 10 continuously moving lengthwise through a web handling apparatus comprised of a frame 12, a pair of spaced parallel idler rollers 14, 16 extending horizontally, for example, generally in a common horizontal plane, and a web tensioning guide roll or roller 18 extending generally parallel to and located between but displaced from, e.g., above, the plane of the two idler rollers 14, 16 by an amount such that the web 10, as it moves over the guide roll 18, is displaced from its normal line of movement parallel to the plane of the idler rollers 14, 16 and wraps partly around the guide roll 18. The tension in the web 10 thus exerts a force downwardly against the guide roll 18 which is located somewhere between the two idler rollers 14, 16, the direction of which force depends upon the angle subtended by the web as it passes over the web tensioning guide roll 18. Thus, where the guide roll 18 is located midway between the two idler rollers 14, 16, the force exerted by the tensioned web against the guide roll 18 is then directed vertically downward there against. The web handling apparatus is conventional and is shown schematically with only those parts thereof pertinent to the present invention being shown.

The guide roll 18 is supported at one end on a horizontally extending parallel support shaft 20. Shaft 20 extends transversely from the side frame portion 12 of the apparatus, and the end of this shaft is supported relative to the side frame portion by means of a force sensing means or transducer device A in a manner in accordance with the present invention.

Figure 2:
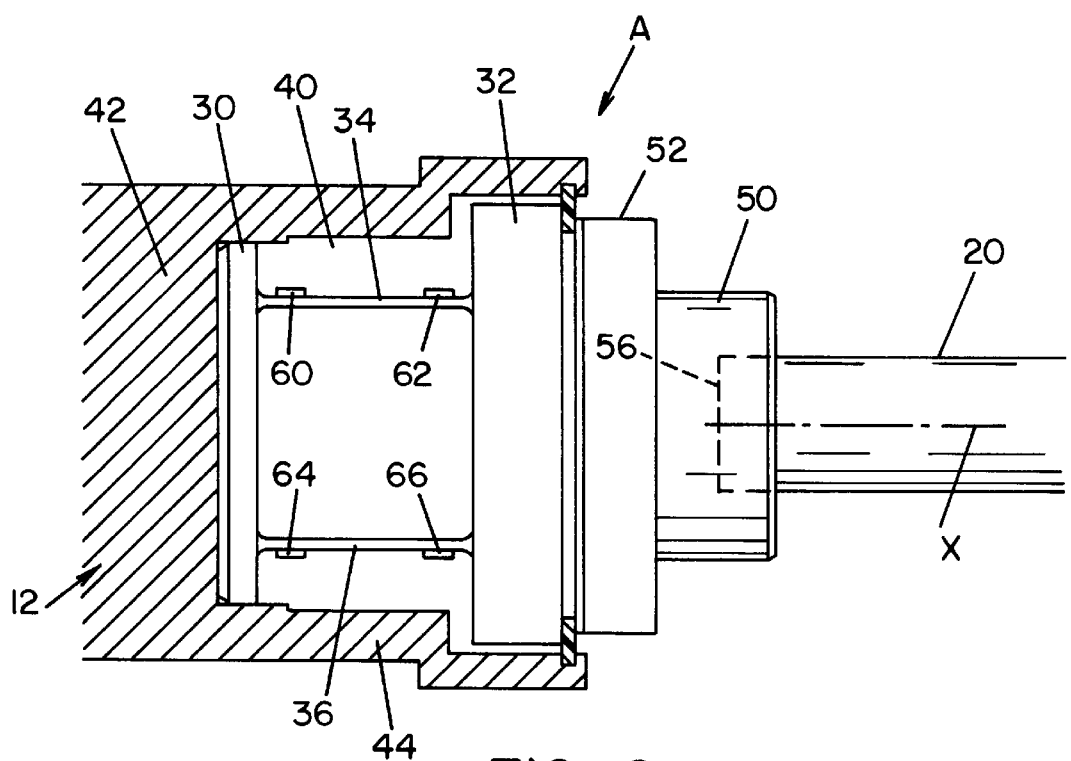
FIG. 2 is an enlarged fragmentary vertical sectional view of one end of the web tension measuring apparatus comprising the invention.

In the embodiment shown in FIG. 2, the force-sensing means comprises a sensor beam member A, has base and plates 30, 32, and held in spaced parallel relationship transversely of the shaft 20 by a pair of spaced parallel arms 34, 36 which, as shown, may be of comparatively thin plate-shaped form and disposed flatwise of and parallel to and laterally spaced apart, e.g., vertically spaced, on opposite sides of and preferably equidistant from the axis of shaft 20 in the unloaded condition thereof. These arms 34, 36 are fastened at their respective ends to the plates 30, 32 by any suitable means; e.g., welding, bolting, screwing or integral as shown.

Referring now to FIG. 2, plates 30, 32 and arms 34 and 36 are mounted within a cylindrical hollow interior or open end chamber 40 of a cup-shaped base or housing 42. Preferably, plate 30 is rigidly fastened to housing 42 by welding, bolting, screwing or the like. The base or housing 42 in turn is mounted on the frame 12 of the apparatus, with the open end of its chamber 40 facing toward an end of the guide roll support shaft 20, by means of welding, bolting, screwing or the like. Housing 42 is mounted on the frame 12 so that the spaced strain beam or bridge portions 34, 36 are disposed flatwise in respective horizontal planes which extend parallel to and on opposite sides of the axis X of the guide roll support shaft 20 in the unloaded condition thereof, and which planes are disposed normal to the direction of the forces imposed on the guide roll 18 and its support shaft 20 due to the tension in the moving web 10. Thus, where these web tension forces are to be directed vertically downward against the guide roll 18, housing 42 is mounted on the frame 12 with the strain beam or bridge portions 34, 36 of the sensor beam disposed flatwise in approximately parallel horizontal planes. The strain beams 34, 36 are cantilever mounted at their anchor ends on the fixed base end plate portion 30 so that their other ends are free to bend or deflect downwardly when forces are imposed on the movable plate 32 by the downward forces imposed on the guide roll shaft 20 due to the tension in the web 10. As the downward force on the movable plate 32 increases, the upper surfaces of the strain beam portions 34, 36 adjacent the base end plate portion 30 are in a state of increasing tension while the opposite or lower surfaces adjacent the base end plate portion 30 are in a state of increasing compression. Conversely, as the downward force on the movable plate 32 decreases, the upper surfaces of the strain beam portions 34, 36 adjacent the plate portion 30 are in a state of decreasing tension while the lower surfaces adjacent the plate portion 30 are in a state of decreasing compression.

As shown in FIG. 2, the movable end plate portion 32 is of somewhat smaller diameter than the diameter of the cylindrical chamber or bore wall 44 of the housing 42 so as to provide a slight clearance there between for permitting a limited amount of downward deflection movement of the sensor beam members 34, 36 and end plate portion 32 by the web tension forces applied to the guide roll support shaft 20. The wall 44 of the housing chamber or bore 40 thus serves as a positive mechanical stop during the operation of the apparatus for engaging with the periphery of the movable end plate portion 32 to prevent excessive downward deflection and resulting overloading of the strain beam portions 34, 36 thereof.

The end 56 of shaft 20 is coupled to and supported in place by a mounting arrangement that preferably includes a cup-shaped end receptacle 50 coupled to boss 52 and projecting in a direction axially endwise of the shaft end 56 from a coupling member fixedly secured on the shaft end. Boss 52 is coupled to plate 32, preferably by a weld, bolts, screws or the like. The shaft 20 thereby is supported on transducer device A by a receptacle 50.

As can be appreciated, this arrangement eliminates the relatively expensive machining operations heretofore conventionally employed for such purpose and eliminates the need for totally removing, from the metal block member, the entire inner portion of the metal block member lying between the two beam elements 34, 36. Thus, components of transducer device A can be formed from metal and/or plastic. Preferably, the components are formed from a suitable metallic material such as aluminum or steel.

Figure 4A:
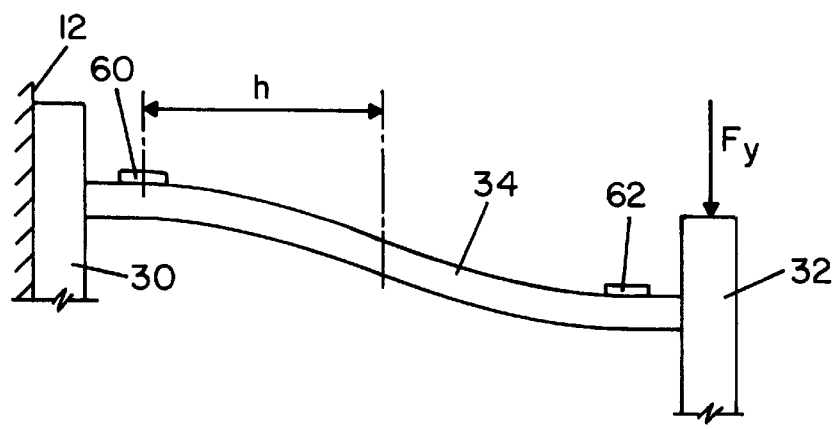
FIG. 4A–4B are schematic drawings of the bending and compression stress applied to the sensor of the present invention.

In the embodiment of the invention shown, the arms or strain beam elements 34, 36 form twin support means for supporting the movable end plate portion 32 relative to the base end plate portion 30 thereof, and at the same time form resilient or flexurable beam means allowing the plate portion 32 to move downwardly parallel relative to the base end plate portion 30, and in a direction transversely of the shaft axis X and coincident axis of the receptacle 50, due to forces imposed on the guide roll 18 and associated support shaft 20 by the tensions in the continuously moving web 10. The web 10 imposes a vertical force downwardly in the vertical axial plane of the shaft 20 which force is applied by the shaft end to the plate 32, and this force then causes the strain beam arms or elements 34, 36 to bend in like, slightly S-shaped manner, as shown in FIG. 4A. Because the arms 34, 36 are widely spaced apart relative to their length, the movable end plate portion 32, as it moves vertically in a direction transversely to the shaft axis 20, is held by the arms 34, 36 in parallel relationship with the fixed base end plate portion 30. The forces applied to arms 34, 36 are such as never to stress the arms beyond their elastic limit so that they always function as a perfect cantilever spring, and the end plate 32 will always move in exact linear relationship to the forces applied thereto.

Figure 3:
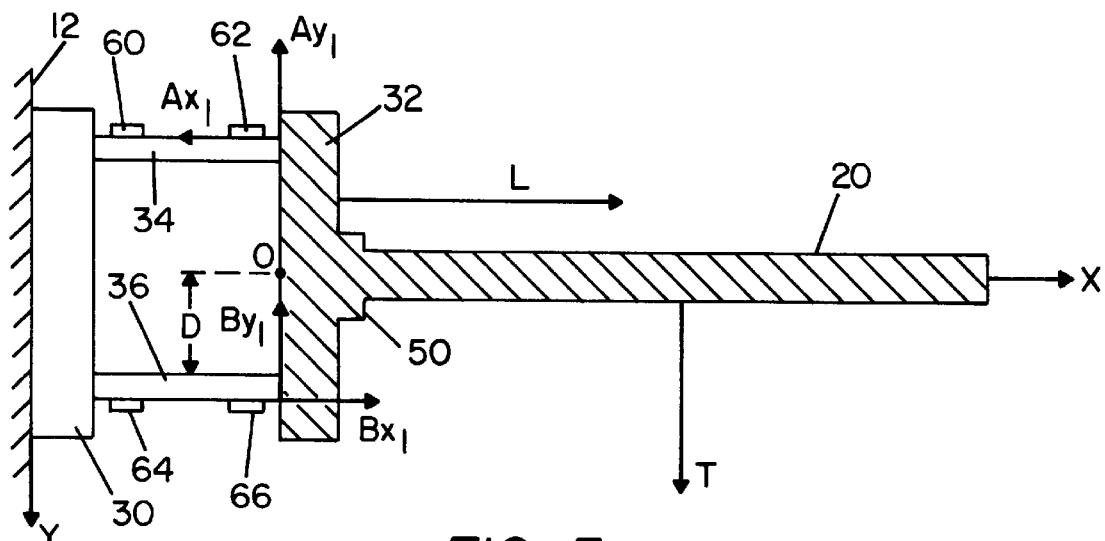
FIG. 3 is a schematic illustration of forces present in the system shown in FIG. 2.

In the embodiment shown, the arms 34, 36 both form means for supporting the plate 32 relative to the plate 30, and at the same time resilient or flexurable means allowing the plate 32 to move parallel relative to the plate 30 and transversely to the axis of shaft 20 due to forces imposed on the roller 18 due to tensions in the web 10. As shown in FIG. 3, the web imposes a vertical force T downwardly in the Y plane of the drawing, which force is applied to the plate 32 through the rigid coupling and this force T causes the arms 34, 36 to bend as beams.

As shown in FIG. 3, the twin beam support of the plate 32 is such that the axis of the boss 52 while moving downwardly under the web tension forces, does not rotate. The axis of boss 52 in the beam stressed and unstressed positions is always parallel. This becomes particularly of importance when it is realized that the shaft 20 on which the roller 18 is rotatably supported will bend under the web tension forces. Thus, due to the bending of this shaft, the extended axis of the shaft 20 will no longer be parallel with the axis of the boss 52. This bending of the shaft creates a force couple on the boss 52 which would normally tend to rotate the plate 32. Because the plate 32 is firmly supported at two spaced points, this force couple cannot cause rotation of the plate. However, the force couple does place arm 34 in longitudinal tension and the other arm 36 in longitudinal compression (or vice versa) as the force couple increases (or decreases) with variations in the web tension.

To measure the radial force T applied to roller 18 by web 10, strain gauges 60, 62 are mounted on the upper surface of arm 34, one adjacent each end thereof, this being the point of maximum flexure of the arm 34 due to forces exerted thereon by the moving web 10. Thus, as viewed in FIG. 3, strain gauge 60 is in a state of bending tension while strain gauge 62 is in a state of bending compression. The resistance of these gauges always varies in opposite directions. The same would be true for the strain gages 64, 66 on arm 36.

As shown in FIG. 3, arms 34 and 36 are symmetrically positioned about the longitudinal axis of shaft 20. Preferably, arms 34 and 36 position parallel to one another. Gauges 60, 62 and 64, 66 are also preferably symmetrically positioned on arms 34, 36. The symmetry of arms 34, 36 about the axis of shaft 20 is such that the strain gauges can be wired to measure force T on roller 18 independent of the length of shaft 20. The isolation of the forces applied to plate 32 by the web on roller 18 is shown in FIG. 3.

The forces exerted by arms 34, 36 are:

$Ax_1$ and $Ay_1$ at point A $Bx_1$ and $By_1$ at point B

When isolating the forces applied to shaft 20 and plate 32 as represented by the shaded portion of FIG. 3, the equilibrium of the shaded portion is:

X direction: $Ax_1 = -Bx_1$

Y direction: $Ay_1 + By_1 = -T$

Therefore, by symmetry and homogeneity of the arms 34, 36:

$$Ay_1 = By_1 = -T/2.$$

The moment about point O is:

$$(Ax_1 + Bx_1) \cdot D = T \cdot L$$

wherein L is the length of shaft 20 and D is the distance from point O to the neutral axis of arms 34 or 36. By combining these equations, $Ax_1$ and $Bx_1$ are represented as follows:

$$-Ax_1 = Bx_1 = L \cdot T / (2 \cdot D)$$

Figure 4B:
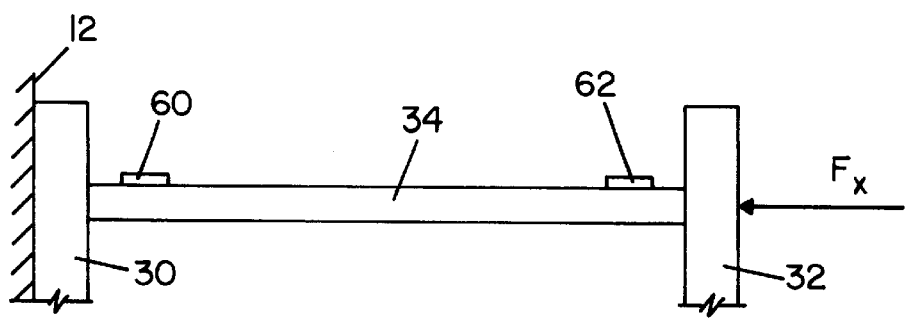

Referring now to FIG. 4A–4B, the bending and compression stresses of arm 34 are illustrated. The bending stress at gauge 60 of arm 34 is:

$$\sigma_{60} = \frac{F_y \cdot h \cdot t}{2I}$$

$F_y$ is the force applied to plate 32 in the Y-axis, t is the thickness of the arm 34 and I is the moment of inertia. The moment of inertia is represented as:

$$I = t^3 \cdot W / 12$$

wherein W is the width of the arm.

Referring now to FIG. 4B, the compression stress in arm 34 is:

$$\sigma_{60} = \frac{F_x}{S}$$

$F_x$ is the force applied to plate 32 in the X-axis and S is the surface area of arm 34. S is the product of the width w of the arm and thickness t of the arm.

By combining the equations above, the stress seen by gauges 60 and 62 are as follows:

Stress seen by gauge 60:

$$\sigma_{60} = \frac{A_{y_1} \cdot h \cdot t}{2I} + \frac{A_{x_1}}{S} = \frac{T \cdot h \cdot t}{4I} + \frac{T \cdot L}{2D \cdot S}$$

Stress seen by gauge 62:

$$\sigma_{62} = \frac{-A_{y_1} \cdot h \cdot t}{2I} + \frac{A_{x_1}}{S} = \frac{-T \cdot h \cdot t}{4I} + \frac{T \cdot L}{2D \cdot S}$$

wherein h is the distance gauge 60 and 62 are positioned from the middle of arm 34. When the stresses at gauges 60 and 62 are subtracted from one another, the differences of these two stresses is represented as follows:

$$\sigma_{60} - \sigma_{62} = \frac{T \cdot h \cdot t}{2I}$$

Figure 5A:
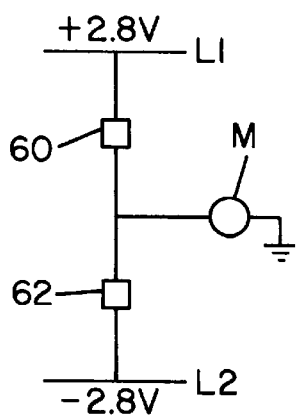
FIG. 5A–5B are schematic wire drawings showing how the strain gauges of FIG. 2 are electrically connected to a monitor.

As is illustrated above, the difference of $\sigma_{60}$ and $\sigma_{62}$ is independent of length L of support shaft 20. Therefore, gauges 60 and 62 can be wired to a monitor, as illustrated in FIG. 5A, force T independently of the length of support shaft 20. As can be appreciated, a variety of positions for the gauges can be used in a two gauge configuration. One such alternate position for the gauges is positioning both gauges on arm 36. Several configurations for using two stress gauges and the positioning and wiring of such gauges to the monitor force T are illustrated in FIGS. 6E–6H.

As can be appreciated, a four gauge configuration can be used to measure force T applied to tension roller 18 by web 10. Referring again to FIG. 3, the stresses seen by gauges 60, 62, 64 and 66 are as follows:

$$\sigma_{60} = \frac{A_{y_1} \cdot h \cdot t}{2I} + \frac{A_{x_1}}{S} = \frac{T \cdot h \cdot t}{4I} + \frac{T \cdot L}{2D \cdot S}$$

$$\sigma_{62} = \frac{-A_{y_1} \cdot h \cdot t}{2I} + \frac{A_{x_1}}{S} = -\frac{T \cdot h \cdot t}{4I} + \frac{T \cdot L}{2D \cdot S}$$

$$\sigma_{64} = \frac{-A_{y_1} \cdot h \cdot t}{2I} - \frac{A_{x_1}}{S} = -\frac{T \cdot h \cdot t}{4I} - \frac{T \cdot L}{2D \cdot S}$$

$$\sigma_{66} = \frac{A_{y_1} \cdot h \cdot t}{2I} - \frac{A_{x_1}}{S} = \frac{T \cdot h \cdot t}{4I} - \frac{T \cdot L}{2D \cdot S}$$

by combining these equations, the following relationship is obtained:

$$\sigma_{60} + \sigma_{66} = -(\sigma_{62} + \sigma_{64}) = \frac{T \cdot h \cdot t}{2I}$$

$$(\sigma_{60} + \sigma_{66}) - (\sigma_{62} + \sigma_{64}) = \frac{T \cdot h \cdot t}{I}$$

Figure 5B:
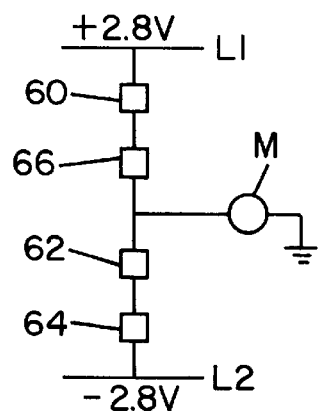
Figure 6A:
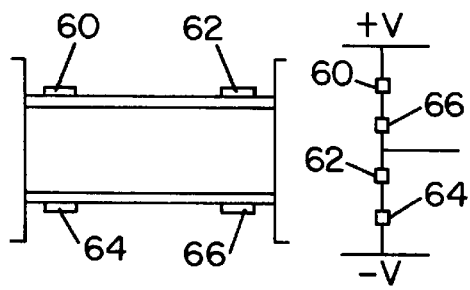
FIG. 6A–6H illustrates various embodiments of the invention as to the placement of the strain gauges and the corresponding wiring of the strain gauges to a monitor.
Figure 6B:
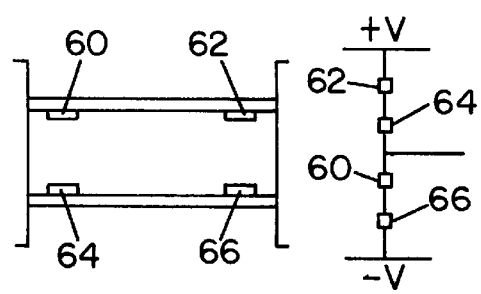
Figure 6C:
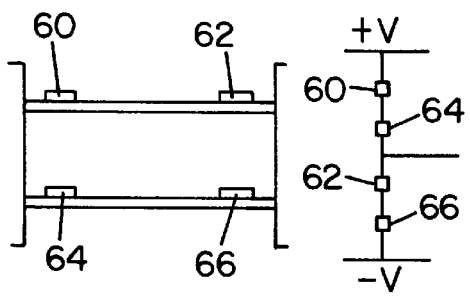
Figure 6D:
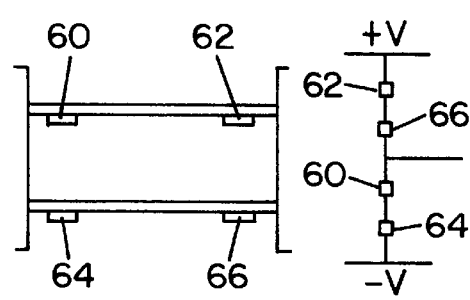
Figure 6E:
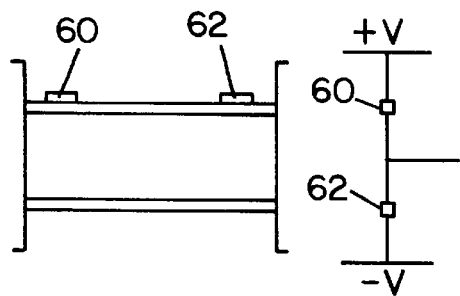
Figure 6F:
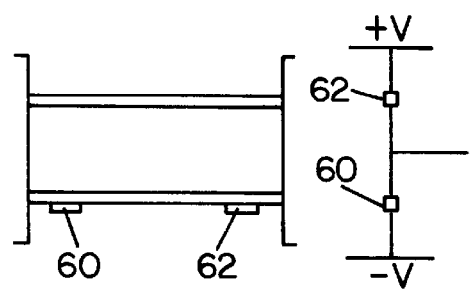
Figure 6G:
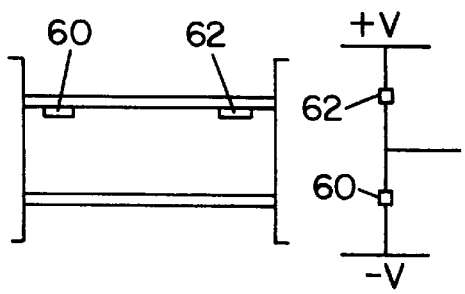
Figure 6H:
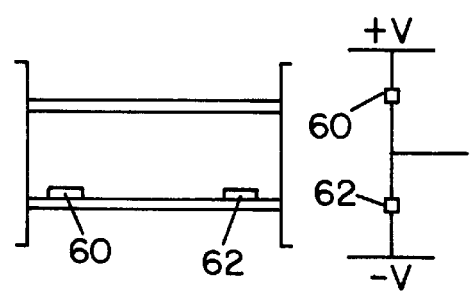

As is illustrated above, the difference of $(\sigma_{60} + \sigma_{66})$ and $(\sigma_{62} + \sigma_{64})$ is independent of length L of support shaft 20. The four gauges can thus be wired to a monitor, as illustrated in FIG. 5B, force T independently of the length of support shaft 20. As can be appreciated, a variety of positions for the four gauge arrangement can be used. Several configurations for using four stress gauges and the positioning and wiring of such gauges to the monitor are illustrated in FIGS. 6A–6D. The four gauge arrangement is preferably used when increased accuracy in the measurement of the force T is required.

As illustrated in FIG. 2 and FIG. 5B, the strain gauges are connected in a circuit in such a manner that as the resistances of strain gages 60, 62, 64, 66 change under bending stresses, an indication will be given on meter M connected to the circuit. This circuit is energized at the diagonally opposite points from a suitable AC or DC power source through wires L1, L2. Obviously, electrical amplifying means (not shown) may be substituted for meter M which means can control servo motors or the like for adjusting the web tension.

By using the twin beam design and arranging and wiring the strain gauges in a particular manner, it is possible to manufacture a cantilever transducer which measures forces to a support shaft applied to the shaft by a web, which measurement of the forces is independent of the length of the shaft. Therefore, the moment stress component measured by the stress gauges can be completely canceled out, thus eliminating the dependence of the radial force T measurement on the length of the shaft. As can be appreciated, the point at which the load on the shaft is applied by the web does not affect the stress readings since the dependence of the position of the load on the shaft is canceled out, thus not a function of the measurement of the radial force T on the shaft. Therefore, the same load at any point along the shaft will produce the same output.

From the above description, it will be evident that a web tension sensing and measuring apparatus or transducer is provided by the present invention which is of simple construction comprised of component parts which are easy and inexpensive to fabricate and do not require critical manufacturing operations and which are easy to assemble and disassemble.

The web tension measuring device according to the invention, moreover, and particularly in view of its preferred twin beam type, is characterized by exceptionally low hysteresis in its electrical response curve such as rendering the device eminently suitable for use not only in most ordinary service applications, but also for those applications which require extremely critical force measurements, and it provides accurate web tension measurements over an extended period of service time.

The design of the sensor arrangement permits it to be attached to a variety of shaft lengths and diameters. The sensor arrangement preferably has a standard mounting face to accommodate many shaft sizes by means of adapters preferably attached to the mounting face. The fit of the shaft in the shaft adapter should be tight enough to eliminate any movement of the shaft when in use. The fit also is preferably loose enough to permit assembly of the shaft into the adapter without difficulty. The housing for the sensor arrangement is preferably circular in shape. This housing is preferably used on flange mounting, bearing-type mounting, and stud mounting. The electrical connector to the sensors preferably is located either on the end or the side of the sensor, depending upon the selected mounting configuration. Space is preferably provided inside the body of the sensor arrangement to accommodate integrated electronics and the like. Some of the principal advantages of the sensor arrangement are:

Measures the shear load on the cantilever roller—relatively insensitive to moment affects of load.

Accurately measures tension in webs that wander over sensing roller.

Insensitive to web position of narrow webs on wide sensing rollers.

Wide range of standard shaft size adapters to fit a variety of shafts.

Specified values of "Tilt" caused by cantilever bending under load.

Heavy duty construction

Built in overload stops.

High level, linear output signal.

High frequency response.

Wide temperature operating range.

Corrosion resistant.

Modular construction with multiple mounting options.

Easy alignment of transducer to match applied force direction.

The invention has been described in connection with a preferred embodiment and certain modifications thereof. Obviously, further modifications and alterations will occur to others upon a reading and understanding of this specification and it is my intention to include all such modifications and alterations insofar as they come within the scope of the present invention.

Having thus described the invention, it is claimed:

1. A web tension measuring device to measuring the tension of a web being supported on a shaft comprising a transducer arrangement to fully support said shaft at one end of the shaft, said transducer arrangement including flexure beam means cantilever supported at one end and extending toward said one end of said shaft, and strain gauge means mounted on said flexure beam means, said flexure beam means having two support beams oriented about the longitudinal axis of said shaft, said strain gauge means including a plurality of strain gauges mounted on at least one of said two support beams, said strain gauge means being electrically connected to measure the radial forces applied to said shaft independently of the length of said shaft and which radial forces are representative of the tension in the moving web.

2. The measuring device as defined in claim 1, wherein said two support beams being positioned substantially parallel to one another.

3. The measuring device as defined in claim 1, wherein said two support beams being position substantially symmetrically about said longitudinal axis of said shaft.

4. The measuring device as defined in claim 2, wherein said two support beams being positioned substantially symmetrically about said longitudinal axis of said shaft.

5. The measuring device as defined in claim 1, wherein said two of said gauges being positioned on one of said support beams.

6. The measuring device as defined in claim 2, wherein two of said gauges being positioned on one of said support beams.

7. The measuring device as defined in claim 3, wherein two of said gauges being positioned on one of said support beams.

8. The measuring device as defined in claim 4, wherein two of said gauges being positioned on one of said support beams.

9. The measuring device as defined in claim 1, wherein said gauges are substantially symmetrically oriented along the length of at least one of said support beams.

10. The measuring device as defined in claim 5, wherein said gauges are substantially symmetrically oriented along the length of at least one of said support beam.

11. The measuring device as defined in claim 7, wherein said gauges are substantially symmetrically oriented along the length of at least one of said support beam.

12. The measuring device as defined in claim 8, wherein said gauges are substantially symmetrically oriented along the length of at least one of said support beam.

13. The measuring device as defined in claim 1, wherein one of said gauges on one of said beams is connected in series with another of said gauges on said other beam.

14. The measuring device as defined in claim 2, wherein one of said gauges on one of said beams is connected in series with another of said gauges on said other beam.

15. The measuring device as defined in claim 3, wherein one of said gauges on one of said beams is connected in series with another of said gauges on said other beam.

16. The measuring device as defined in claim 11, wherein one of said gauges on one of said beams is connected in series with another of said gauges on said other beam.

17. The measuring device as defined in claim 12, wherein one of said gauges on one of said beams is connected in series with another of said gauges on said other beam.

18. The measuring device as defined in claim 1, wherein said strain gauge means includes four gauges, two of said gauges being positioned on one support beam and the other two gauges being positioned on the other support beam.

19. The measuring device as defined in claim 2, wherein said strain gauge means includes four gauges, two of said gauges being positioned on one support beam and the other two gauges being positioned on the other support beam.

20. The measuring device as defined in claim 3, wherein said strain gauge means includes four gauges, two of said gauges being positioned on one support beam and the other two gauges being positioned on the other support beam.

21. The measuring device as defined in claim 16, wherein said strain gauge means includes four gauges, two of said gauges being positioned on one support beam and the other two gauges being positioned on the other support beam.

22. The measuring device as defined in claim 17, wherein said strain gauge means includes four gauges, two of said gauges being positioned on one support beam and the other two gauges being positioned on the other support beam.

23. The measuring device as defined in claim 18, wherein said gauges are substantially symmetrically oriented along the length of both of said support beams.

24. The measuring device as defined in claim 19, wherein said gauges are substantially symmetrically oriented along the length of both of said support beams.

25. The measuring device as defined in claim 21, wherein said gauges are substantially symmetrically oriented along the length of both of said support beams.

26. The measuring device as defined in claim 22, wherein said gauges are substantially symmetrically oriented along the length of both of said support beams.

27. The measuring device as defined in claim 23, wherein one gauge on said one beam is connected in series with one gauge on said other beam.

28. The measuring device as defined in claim 1, wherein said shaft is rigidly coupled to said transducer arrangement.

29. The measuring device as defined in claim 25, wherein said shaft is rigidly coupled to said transducer arrangement.

30. The measuring device as defined in claim 26, wherein said shaft is rigidly coupled to said transducer arrangement.

31. The measuring device as defined in claim 1, wherein said coupling for said shaft is bearingless.

32. The measuring device as defined in claim 29, wherein said coupling for said shaft is bearingless.

33. The measuring device as defined in claim 30, wherein said coupling for said shaft is bearingless.

34. The measuring device as defined in claim 1, including a dust seal to protect said transducer arrangement from foreign objects when mounted in a frame.

35. The measuring device as defined in claim 32, including a dust seal to protect said transducer arrangement from foreign objects when mounted in a frame.

36. The measuring device as defined in claim 33, including a dust seal to protect said transducer arrangement from foreign objects when mounted in a frame.

37. A web tension measuring device for an apparatus having a frame and adapted to handle a continuously moving web passing partly around and tensioned by a transversely extending shaft supported only on one of its ends by said device, said device comprising a housing mounted on said frame and having a chamber with an open end disposed opposite and facing toward said one end of said shaft, flexure beam means cantilever supported at one end on said frame within said housing and extending toward said one end of said shaft in a generally axially aligned relation therewith, and strain gauge means mounted on said flexure beam means, said flexure beam means having two support beams oriented about the longitudinal axis of said shaft, said strain gauge means including a plurality of strain gauges mounted on at least one of said two support beams, said strain gauge means being electrically connected to measure the radial forces applied to said shaft independently of the length of said shaft and which radial forces are representative of the tension in the moving web.

38. The measuring device as defined in claim 37, wherein said two support beams being positioned substantially parallel to one another.

39. The measuring device as defined in claim 37, wherein said two support beams being position substantially symmetrically about said longitudinal axis of said shaft.

40. The measuring device as defined in claim 37, wherein two of said gauges being positioned on one of said support beams.

41. The measuring device as defined in claim 37, wherein at least two of said gauges being substantially symmetrically oriented along the length of one of said support beams.

42. The measuring device as defined in claim 37, wherein one of said gauges on one of said beams is connected in series with another of said gauges on said other beam.

43. The measuring device as defined in claim 37, wherein said strain gauge means includes four gauges, two of said gauges being positioned on one support beam and the other two gauges being positioned on the other support beam.

44. The measuring device as defined in claim 43, wherein said gauges being substantially symmetrically oriented along the length of at least one of said support beams.

45. A method of measuring the tension of a web comprising the steps of:
 a. providing a shaft having a longitudinal axis adapted to handle a continuously moving web passing partly around and tensioned by the shaft;
 b. supporting said shaft at only one end by a web tension measuring device to measuring the tension of a web being supported on said shaft, said web tension measuring device having a transducer arrangement connected between a frame and said one end of said shaft, said transducer arrangement including flexure beam means cantilever supported at one end and extending toward said one end of said shaft and strain gauge means mounted on said flexure beam means, said flexure beam means having two support beams oriented about said longitudinal axis of said shaft, said strain gauge means including a plurality of strain gauges;
 c. positioning at least one of said strain gauges on at least one of said two support beams; and
 d. electrically connecting said strain gauge means to measure radial forces applied to said shaft that are independent of the length of said shaft and representative of the tension in the moving web.

46. The method as defined in claim 45, wherein said two support beams being positioned substantially parallel to one another.

47. The method as defined in claim 45, wherein said two support beams being position substantially symmetrically about said longitudinal axis of said shaft.

48. The method as defined in claim 46, wherein said two support beams being position substantially symmetrically about said longitudinal axis of said shaft.

49. The method as defined in claim 45, wherein said two of said gauges being positioned on one of said support beams.

50. The method as defined in claim 48, wherein said two of said gauges being positioned on one of said support beams.

51. The method as defined in claim 50, wherein said gauges are substantially symmetrically oriented along the length of at least one of said support beams.

52. The method as defined in claim 45, wherein one of said gauges on one of said beams is connected in series with another of said gauges on said other beam.

53. The method as defined in claim 48, wherein one of said gauges on one of said beams is connected in series with another of said gauges on said other beam.

54. The method as defined in claim 51, wherein one of said gauges on one of said beams is connected in series with another of said gauges on said other beam.

55. The method as defined in claim 45, wherein said strain gauge means includes four gauges, two of said gauges being positioned on one support beam and the other two gauges being positioned on the other support beam.

56. The method as defined in claim 48, wherein said strain gauge means includes four gauges, two of said gauges being positioned on one support beam and the other two gauges being positioned on the other support beam.

57. The method as defined in claim 54, wherein said strain gauge means includes four gauges, two of said gauges being positioned on one support beam and the other two gauges being positioned on the other support beam.

58. The method as defined in claim 45, wherein said shaft is rigidly coupled to said transducer arrangement.

* * * * *